(12) United States Patent
Hudson et al.

(10) Patent No.: US 12,325,624 B2
(45) Date of Patent: Jun. 10, 2025

(54) SEAT ASSEMBLY, CUSHION, AND TOOL AND METHOD OF FORMING

(71) Applicant: Lear Corporation, Southfield, MI (US)

(72) Inventors: Curtis Hudson, Macomb, MI (US); Eric Repke, Milford, MI (US); Lisa Swikoski, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 18/178,818

(22) Filed: Mar. 6, 2023

(65) Prior Publication Data

US 2024/0300804 A1 Sep. 12, 2024

(51) Int. Cl.
*B68G 7/02* (2006.01)
*B68G 15/00* (2006.01)
*B29C 33/04* (2006.01)

(52) U.S. Cl.
CPC .............. *B68G 15/00* (2013.01); *B68G 7/02* (2013.01); *B29C 33/04* (2013.01); *B29C 33/046* (2013.01); *B29C 33/048* (2013.01)

(58) Field of Classification Search
CPC ...... B68G 15/00; B68G 7/02; B29D 99/0092; B29C 33/3814; B29C 33/20–24; B29C 33/04; B29C 33/046; B29C 33/048
See application file for complete search history.

(56) References Cited

U.S. PATENT DOCUMENTS

| | | |
|---|---|---|
| 1,621,008 A | 3/1927 | Fricker |
| 2,130,935 A | 9/1938 | Thompson |
| 2,188,995 A | 2/1940 | Avery et al. |
| 2,630,938 A | 3/1953 | Burnett |
| 2,630,968 A | 3/1953 | Morris |
| 3,155,363 A | 11/1964 | Lohr |
| 3,309,052 A | 3/1967 | Borisof |
| 3,315,283 A | 4/1967 | Larsen |

(Continued)

FOREIGN PATENT DOCUMENTS

| | | |
|---|---|---|
| AU | 2006227668 A1 | 9/2006 |
| AU | 2003296088 B2 | 9/2008 |

(Continued)

OTHER PUBLICATIONS https://www.youtube.com/watch2v=eFiPBu fBe4, The Making of a Newton Wovenaire Crib Mattress, Apr. 21, 2016, 3 pages.

(Continued)

*Primary Examiner* — Andrew L Swanson
(74) *Attorney, Agent, or Firm* — Brooks Kushman P.C.

(57) ABSTRACT

A method is provided with a stranded mesh material blank inserted into a cavity of a tool assembly shaped to form a cushion member. Fluid is circulated above a first temperature threshold through a series of apertures defined in a forming surface of the tool assembly and into the cavity thereby softening the blank and conforming a shape of the blank to the forming surface. Fluid is circulated below a second temperature threshold through the series of apertures in the forming surface and into the cavity thereby setting the shape of the blank to the forming surface and forming a cushion member. A cushion for a seat assembly is provided by a stranded mesh material member. A system is provided with a first tool, a second tool, and one or more inlet manifolds.

21 Claims, 4 Drawing Sheets

(56) References Cited

U.S. PATENT DOCUMENTS

| | | | |
|---|---|---|---|
| 3,630,572 | A | 12/1971 | Homier |
| 3,689,620 | A | 9/1972 | Miyazaki et al. |
| 3,733,658 | A | 5/1973 | Mitchell |
| 3,794,378 | A | 2/1974 | Haslam et al. |
| D239,147 | S | 3/1976 | Karlsen |
| 3,961,823 | A | 6/1976 | Caudill, Jr. |
| 4,031,579 | A | 6/1977 | Larned |
| 4,287,657 | A | 9/1981 | Andre et al. |
| 4,396,823 | A | 8/1983 | Nihei et al. |
| 4,476,594 | A | 10/1984 | McLeod |
| 4,663,211 | A | 5/1987 | Kon |
| 4,751,029 | A | 6/1988 | Swanson |
| 4,859,516 | A | 8/1989 | Yamanaka et al. |
| 4,860,402 | A | 8/1989 | Dichtel |
| 4,876,135 | A | 10/1989 | McIntosh |
| 4,881,997 | A | 11/1989 | Hatch |
| 4,900,377 | A | 2/1990 | Redford et al. |
| 4,913,757 | A | 4/1990 | Yamanaka et al. |
| 4,933,224 | A | 6/1990 | Hatch |
| 4,952,265 | A | 8/1990 | Yamanaka et al. |
| 4,953,770 | A | 9/1990 | Bond, Sr. |
| 5,003,664 | A | 4/1991 | Wong |
| 5,007,676 | A | 4/1991 | Lien |
| 5,016,941 | A | 5/1991 | Yokota |
| 5,092,381 | A | 3/1992 | Feijin et al. |
| 5,095,592 | A | 3/1992 | Doerfling |
| 5,313,034 | A | 5/1994 | Grimm et al. |
| 5,378,296 | A * | 1/1995 | Vesa ................ D04H 1/54 |
| | | | 156/308.2 |
| 5,381,922 | A | 1/1995 | Gladman et al. |
| 5,405,178 | A | 4/1995 | Weingartner et al. |
| 5,441,675 | A * | 8/1995 | Souders .............. B29C 33/3814 |
| | | | 264/402 |
| D364,269 | S | 11/1995 | Sabosky |
| 5,464,491 | A | 11/1995 | Yamanaka |
| 5,482,665 | A | 1/1996 | Gill |
| 5,492,662 | A | 2/1996 | Kargol et al. |
| 5,494,627 | A | 2/1996 | Kargol et al. |
| 5,551,755 | A | 9/1996 | Lindberg |
| 5,569,641 | A | 10/1996 | Smith |
| 5,586,807 | A | 12/1996 | Taggart |
| 5,587,121 | A * | 12/1996 | Vesa ................ D04H 1/55 |
| | | | 264/517 |
| 5,620,759 | A | 4/1997 | Insley et al. |
| 5,622,262 | A | 4/1997 | Sadow |
| 5,639,543 | A | 6/1997 | Isoda et al. |
| 5,669,129 | A | 9/1997 | Smith et al. |
| 5,669,799 | A | 9/1997 | Moseneder et al. |
| 5,733,825 | A | 3/1998 | Martin et al. |
| 5,788,332 | A | 8/1998 | Hettinga |
| 5,811,186 | A | 9/1998 | Martin et al. |
| 5,819,408 | A | 10/1998 | Catlin |
| 5,833,321 | A | 11/1998 | Kim et al. |
| 5,966,783 | A | 10/1999 | Genereux et al. |
| 6,057,024 | A | 5/2000 | Mleziva et al. |
| 6,063,317 | A * | 5/2000 | Carroll, III ............ D04H 1/558 |
| | | | 264/122 |
| 6,131,220 | A | 10/2000 | Morimura |
| 6,272,707 | B1 | 8/2001 | Robrecht et al. |
| 6,283,552 | B1 | 9/2001 | Halse et al. |
| 6,302,487 | B1 | 10/2001 | Fujita et al. |
| 6,347,790 | B1 | 2/2002 | Nishibori et al. |
| 6,378,150 | B1 | 4/2002 | Minegishi et al. |
| D461,746 | S | 8/2002 | Olson et al. |
| 6,457,218 | B1 | 10/2002 | Lawrence |
| 6,558,590 | B1 | 5/2003 | Stewart |
| 6,668,429 | B2 | 12/2003 | Fujisawa et al. |
| 6,766,201 | B2 | 7/2004 | Von Arx et al. |
| 6,776,201 | B2 | 8/2004 | Willis |
| 6,918,146 | B2 | 7/2005 | England |
| D523,330 | S | 6/2006 | Mattesky |
| 7,073,230 | B2 | 7/2006 | Boville |
| 7,100,978 | B2 | 9/2006 | Ekern et al. |
| D530,192 | S | 10/2006 | Becerra |
| 7,128,371 | B2 | 10/2006 | Kawasaki et al. |
| 7,141,768 | B2 | 11/2006 | Malofsky et al. |
| 7,158,968 | B2 | 1/2007 | Cardno |
| D538,704 | S | 3/2007 | Kaminski |
| 7,290,300 | B1 | 11/2007 | Khambete |
| 7,377,762 | B2 | 5/2008 | Nishibori et al. |
| 7,427,103 | B2 | 9/2008 | Weber |
| 7,481,489 | B2 | 1/2009 | Demick |
| 7,506,939 | B2 | 3/2009 | Borckschneider et al. |
| 7,547,061 | B2 | 6/2009 | Horimatsu et al. |
| 7,549,707 | B2 | 6/2009 | Brennan et al. |
| 7,622,179 | B2 | 11/2009 | Patel |
| 7,625,629 | B2 | 12/2009 | Takaoka |
| 7,669,925 | B2 | 3/2010 | Beck et al. |
| 7,707,743 | B2 | 5/2010 | Schindler et al. |
| 7,771,375 | B2 | 8/2010 | Nishibori et al. |
| 7,837,263 | B2 | 11/2010 | Booth et al. |
| 7,892,991 | B2 | 2/2011 | Yamanaka et al. |
| D636,293 | S | 4/2011 | Dolce et al. |
| 7,946,649 | B2 | 5/2011 | Galbreath et al. |
| 7,993,734 | B2 | 8/2011 | Takaoka |
| 8,052,212 | B2 | 11/2011 | Backendorf |
| 8,056,263 | B2 | 11/2011 | Schindler et al. |
| 8,226,882 | B2 | 7/2012 | Takaoka |
| 8,240,759 | B2 | 8/2012 | Hobl et al. |
| 8,276,235 | B2 | 10/2012 | Naughton |
| 8,277,210 | B2 | 10/2012 | Takaoka |
| D677,193 | S | 3/2013 | MacDonald |
| 8,563,121 | B2 | 10/2013 | Takaoka |
| 8,563,123 | B2 | 10/2013 | Takaoka |
| 8,568,635 | B2 | 10/2013 | Takaoka |
| 8,721,825 | B2 | 5/2014 | Takaoka |
| 8,752,902 | B2 | 6/2014 | Labish |
| 8,757,996 | B2 | 6/2014 | Takaoka |
| 8,828,293 | B2 | 9/2014 | Takaoka |
| 8,882,202 | B2 | 11/2014 | Petzel et al. |
| 8,932,692 | B2 | 1/2015 | Pearce |
| 9,004,591 | B2 | 4/2015 | Murasaki et al. |
| 9,097,921 | B2 | 8/2015 | Ogasawara |
| 9,168,854 | B2 | 10/2015 | Ursino et al. |
| 9,169,585 | B2 | 10/2015 | Takaoka |
| 9,174,404 | B2 | 11/2015 | Takaoka |
| 9,179,748 | B2 | 11/2015 | Esti |
| 9,194,066 | B2 | 11/2015 | Takaoka |
| 9,283,875 | B1 | 3/2016 | Pellettiere |
| 9,334,593 | B2 | 5/2016 | Sasaki |
| 9,434,286 | B2 | 9/2016 | Klusmeier et al. |
| 9,440,390 | B2 | 9/2016 | Takaoka |
| 9,447,522 | B2 | 9/2016 | Zikeli et al. |
| 9,456,702 | B2 | 10/2016 | Miyata et al. |
| 9,528,209 | B2 | 12/2016 | Takaoka |
| 9,561,612 | B2 | 2/2017 | Takaoka |
| 9,598,803 | B2 | 3/2017 | Takaoka |
| 9,615,670 | B2 | 4/2017 | Takaoka |
| 9,616,790 | B2 | 4/2017 | Stankiewicz et al. |
| 9,617,021 | B2 | 4/2017 | McCorkle et al. |
| 9,669,744 | B2 | 6/2017 | Cao et al. |
| 9,688,007 | B2 | 6/2017 | Cheng |
| 9,708,067 | B2 | 7/2017 | Wilson et al. |
| 9,751,442 | B2 | 9/2017 | Smith |
| 9,771,174 | B2 | 9/2017 | Murray |
| D798,875 | S | 10/2017 | Huang |
| 9,789,796 | B1 | 10/2017 | White |
| 9,809,137 | B2 | 11/2017 | Kheil |
| 9,918,559 | B2 | 3/2018 | Osaki |
| 9,918,560 | B2 | 3/2018 | Osaki |
| 9,925,899 | B2 | 3/2018 | Mogi et al. |
| 9,938,649 | B2 | 4/2018 | Taninaka et al. |
| 9,970,140 | B2 | 5/2018 | Taninaka et al. |
| 10,118,323 | B2 | 11/2018 | Fujita et al. |
| 10,150,320 | B2 | 12/2018 | Ellringmann et al. |
| 10,231,511 | B2 | 3/2019 | Guyan et al. |
| 10,233,073 | B2 | 3/2019 | Takaoka |
| 10,266,977 | B2 | 4/2019 | Takaoka |
| 10,316,444 | B2 | 6/2019 | Wakui et al. |
| 10,328,618 | B2 | 6/2019 | Takaoka |
| 10,343,565 | B2 | 7/2019 | Baek et al. |
| 10,398,236 | B2 | 9/2019 | Achten et al. |
| 10,399,848 | B2 | 9/2019 | Kristo et al. |
| 10,414,305 | B2 | 9/2019 | Ishii et al. |

(56) References Cited

U.S. PATENT DOCUMENTS

| | | |
|---|---|---|
| 10,421,414 B2 | 9/2019 | Townley et al. |
| 10,501,598 B2 | 12/2019 | Baldwin et al. |
| 10,604,040 B2 | 3/2020 | Clauser et al. |
| 10,618,799 B2 | 4/2020 | Shah et al. |
| 10,730,419 B2 | 8/2020 | Low et al. |
| 10,736,435 B2 | 8/2020 | Duncan et al. |
| 10,744,914 B2 | 8/2020 | Baek et al. |
| 10,750,820 B2 | 8/2020 | Guyan |
| RE48,225 E | 9/2020 | Kheil et al. |
| 10,780,805 B2 | 9/2020 | Kamata |
| 10,806,272 B2 | 10/2020 | Ando et al. |
| 10,821,862 B2 | 11/2020 | Russman et al. |
| 10,843,600 B2 | 11/2020 | Booth et al. |
| 10,882,444 B2 | 1/2021 | Townley et al. |
| 10,889,071 B2 | 1/2021 | Kojima et al. |
| D909,792 S | 2/2021 | Pound |
| 10,934,644 B2 | 3/2021 | Taninaka et al. |
| 11,007,761 B2 | 5/2021 | Ben-Daat et al. |
| 11,168,421 B2 | 11/2021 | Wakui et al. |
| 11,186,336 B2 | 11/2021 | Primeaux et al. |
| D948,764 S | 4/2022 | Peterson |
| 11,369,532 B2 | 6/2022 | Wilson et al. |
| 11,383,625 B2 | 7/2022 | Voigt et al. |
| 11,554,699 B2 | 1/2023 | Liau et al. |
| D1,005,380 S | 11/2023 | McWilliams et al. |
| 2002/0101109 A1 | 8/2002 | Stiller et al. |
| 2002/0193221 A1 | 12/2002 | Tisi |
| 2003/0026970 A1 | 2/2003 | Hernandez et al. |
| 2003/0032731 A1 | 2/2003 | Oswald et al. |
| 2003/0061663 A1 | 4/2003 | Lampel |
| 2003/0092335 A1 | 5/2003 | Takaoko |
| 2004/0036326 A1 | 2/2004 | Bajic et al. |
| 2004/0063450 A1 | 4/2004 | Uhlik |
| 2004/0099981 A1 | 5/2004 | Gerking |
| 2004/0126577 A1 | 7/2004 | Ueno et al. |
| 2004/0142619 A1 | 7/2004 | Perez |
| 2004/0255385 A1 | 12/2004 | England |
| 2005/0030011 A1 | 2/2005 | Shimizu et al. |
| 2005/0066423 A1 | 3/2005 | Hogan |
| 2005/0198874 A1 | 9/2005 | Wurm |
| 2005/0238842 A1 | 10/2005 | Schindzielorz et al. |
| 2006/0068120 A1 | 3/2006 | Sreenivasan et al. |
| 2006/0116045 A1 | 6/2006 | Nishibori et al. |
| 2006/0198983 A1 | 9/2006 | Patel |
| 2006/0200119 A1 | 9/2006 | Vaska et al. |
| 2006/0200120 A1 | 9/2006 | DiCarlo et al. |
| 2006/0237986 A1 | 10/2006 | Brockschneider et al. |
| 2007/0001336 A1 | 1/2007 | Nishibori et al. |
| 2007/0057414 A1 | 3/2007 | Hartge |
| 2007/0066197 A1 | 3/2007 | Woo et al. |
| 2007/0134464 A1 | 6/2007 | Schindzielorz et al. |
| 2007/0207691 A1 | 9/2007 | Cobbett Wiles et al. |
| 2008/0099458 A1 | 5/2008 | Hilmer |
| 2008/0102149 A1 | 5/2008 | Williams |
| 2008/0203615 A1* | 8/2008 | Brum ............... B29C 43/027 264/267 |
| 2008/0252111 A1 | 10/2008 | Rothkop et al. |
| 2008/0254281 A1 | 10/2008 | Chen et al. |
| 2008/0309143 A1 | 12/2008 | Booth et al. |
| 2009/0008377 A1 | 1/2009 | Nathan et al. |
| 2009/0108494 A1 | 4/2009 | Ito et al. |
| 2009/0152909 A1 | 6/2009 | Andersson |
| 2009/0269570 A1 | 10/2009 | Takaoka |
| 2009/0269571 A1 | 10/2009 | Takaoka |
| 2010/0181796 A1 | 7/2010 | Galbreath et al. |
| 2010/0258334 A1 | 10/2010 | Akaike et al. |
| 2011/0252568 A1 | 10/2011 | Ramp |
| 2011/0278902 A1 | 11/2011 | Galbreath et al. |
| 2011/0316185 A1 | 12/2011 | Takaoka |
| 2012/0042452 A1 | 2/2012 | Takaoka |
| 2012/0104646 A1 | 5/2012 | Takaoka |
| 2012/0112515 A1 | 5/2012 | Labish |
| 2012/0180939 A1 | 7/2012 | Takaoka |
| 2012/0181841 A1 | 7/2012 | Petzel et al. |
| 2012/0301701 A1 | 11/2012 | Takaoka |
| 2012/0319323 A1 | 12/2012 | Takaoka |
| 2012/0328722 A1 | 12/2012 | Takaoka |
| 2013/0000043 A1 | 1/2013 | Bullard et al. |
| 2013/0020016 A1 | 1/2013 | Takaoka |
| 2013/0137330 A1 | 5/2013 | Grimm |
| 2013/0161858 A1 | 6/2013 | Sasaki |
| 2013/0164123 A1 | 6/2013 | Helmenstein |
| 2013/0189472 A1 | 7/2013 | Takaoka |
| 2013/0200661 A1 | 8/2013 | Klusmeier et al. |
| 2014/0029900 A1 | 1/2014 | Logan, Jr. et al. |
| 2014/0035191 A1 | 2/2014 | Takaoka |
| 2014/0037907 A1 | 2/2014 | Takaoka |
| 2014/0037908 A1 | 2/2014 | Takaoka |
| 2014/0042792 A1 | 2/2014 | Kajiwara |
| 2014/0062161 A1 | 3/2014 | Elenbaas et al. |
| 2014/0138016 A1 | 5/2014 | Takaoka |
| 2014/0167328 A1 | 6/2014 | Petzel |
| 2014/0354029 A1 | 12/2014 | Takaoka |
| 2014/0370769 A1 | 12/2014 | Osaki |
| 2014/0378015 A1 | 12/2014 | Osaki |
| 2015/0072107 A1 | 3/2015 | Fujita et al. |
| 2015/0091209 A1* | 4/2015 | Mueller ............... B29C 35/045 264/319 |
| 2015/0197056 A1 | 7/2015 | Takaoka |
| 2015/0210192 A1 | 7/2015 | Benson et al. |
| 2015/0219136 A1 | 8/2015 | Koelling |
| 2015/0266263 A1 | 9/2015 | Ichikawa |
| 2015/0272332 A1 | 10/2015 | Noguchi et al. |
| 2015/0274048 A1 | 10/2015 | Mogi et al. |
| 2015/0284894 A1 | 10/2015 | Takaoka |
| 2015/0367583 A1* | 12/2015 | Blot ............... B29C 33/046 425/508 |
| 2016/0009209 A1 | 1/2016 | Cao et al. |
| 2016/0010250 A1 | 1/2016 | Taninaka et al. |
| 2016/0023387 A1 | 1/2016 | Takaoka |
| 2016/0032506 A1 | 2/2016 | Takaoka |
| 2016/0051009 A1 | 2/2016 | Kormann et al. |
| 2016/0052433 A1 | 2/2016 | Ono et al. |
| 2016/0052435 A1 | 2/2016 | Nakada |
| 2016/0096462 A1 | 4/2016 | Kromm et al. |
| 2016/0122925 A1 | 5/2016 | Shah et al. |
| 2016/0144756 A1 | 5/2016 | Ito et al. |
| 2016/0157628 A1 | 6/2016 | Khambete et al. |
| 2016/0174725 A1 | 6/2016 | Takaoka |
| 2016/0263802 A1 | 9/2016 | Takaoka |
| 2016/0318428 A1 | 11/2016 | Hugues |
| 2016/0374428 A1 | 12/2016 | Kormann et al. |
| 2017/0043695 A1 | 2/2017 | Kitamoto et al. |
| 2017/0174346 A1 | 6/2017 | Wilson et al. |
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 | 2/2018 | Dry |
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0229634 A1 | 8/2018 | Baisch et al. |
| 2018/0332663 A1 | 11/2018 | Lisseman et al. |
| 2019/0002272 A1 | 1/2019 | Kristo et al. |
| 2019/0090656 A1 | 3/2019 | Duncan et al. |
| 2019/0125092 A1 | 5/2019 | Ando et al. |
| 2019/0135199 A1 | 5/2019 | Galan Garcia et al. |
| 2019/0161593 A1 | 5/2019 | Hattori |
| 2019/0232835 A1 | 8/2019 | Murakami |
| 2019/0298072 A1 | 10/2019 | Bhatia et al. |
| 2019/0344691 A1 | 11/2019 | Liau et al. |
| 2019/0351787 A1 | 11/2019 | Lodhia et al. |
| 2019/0357695 A1 | 11/2019 | Achten et al. |
| 2019/0381955 A1 | 12/2019 | Mueller et al. |
| 2019/0390382 A1 | 12/2019 | Rong et al. |
| 2020/0017006 A1 | 1/2020 | Booth et al. |
| 2020/0039399 A1 | 2/2020 | Oomen et al. |
| 2020/0165122 A1 | 5/2020 | Salzmann |
| 2020/0180479 A1 | 6/2020 | Russman et al. |
| 2020/0231428 A1 | 7/2020 | Migneco et al. |
| 2020/0262323 A1 | 8/2020 | Robinson et al. |
| 2020/0332445 A1 | 10/2020 | Taninaka et al. |
| 2020/0360210 A1 | 11/2020 | Zoni, III et al. |
| 2021/0024155 A1 | 1/2021 | Primeaux et al. |

(56) References Cited

U.S. PATENT DOCUMENTS

| | | | |
|---|---|---|---|
| 2021/0046731 A1 | 2/2021 | Nishikawa et al. |
| 2021/0054549 A1 | 2/2021 | Takaoka |
| 2021/0074258 A1 | 3/2021 | Konno et al. |
| 2021/0086670 A1 | 3/2021 | Kozlowski et al. |
| 2021/0115607 A1 | 4/2021 | Inoue et al. |
| 2021/0188138 A1 | 6/2021 | Powell et al. |
| 2021/0221266 A1 | 7/2021 | Kozlowski et al. |
| 2021/0291421 A1 | 9/2021 | Nattrass et al. |
| 2021/0299995 A1 | 9/2021 | Sieradzki et al. |
| 2022/0017003 A1 | 1/2022 | Carraro et al. |
| 2022/0017718 A1 | 1/2022 | Martin et al. |
| 2022/0025561 A1 | 1/2022 | Yasui et al. |
| 2022/0169554 A1 | 6/2022 | Du Moulinet D'Hardemare et al. |
| 2022/0178057 A1 | 6/2022 | Maschino et al. |
| 2022/0314851 A1 | 10/2022 | Pereny et al. |
| 2022/0314854 A1 | 10/2022 | Pereny et al. |
| 2022/0370749 A1 | 11/2022 | Dunn et al. |
| 2022/0402416 A1 | 12/2022 | Yang et al. |
| 2022/0410775 A1 | 12/2022 | Aoki et al. |
| 2023/0028451 A1 | 1/2023 | Gastaldi |
| 2023/0173964 A1 | 6/2023 | Webster et al. |
| 2023/0191678 A1 | 6/2023 | Blair et al. |
| 2023/0191680 A1 | 6/2023 | Blair et al. |
| 2023/0322136 A1 | 10/2023 | Wang et al. |

FOREIGN PATENT DOCUMENTS

| | | |
|---|---|---|
| BR | 112014004632 B1 | 4/2021 |
| BR | 112014001603 A2 | 8/2021 |
| BR | 112013020474 B1 | 9/2021 |
| BR | 112017016357 B1 | 3/2022 |
| CA | 3102262 A1 | 12/2019 |
| CN | 100467696 C | 3/2009 |
| CN | 1859862 B | 4/2010 |
| CN | 202509164 U | 10/2012 |
| CN | 104582538 B | 4/2015 |
| CN | 105026632 A | 11/2015 |
| CN | 102959151 B | 4/2016 |
| CN | 105612279 A | 5/2016 |
| CN | 103328711 B | 6/2016 |
| CN | 104024511 B | 8/2016 |
| CN | 106231959 B | 12/2016 |
| CN | 104080959 B | 2/2017 |
| CN | 106387295 A | 2/2017 |
| CN | 103998668 B | 3/2017 |
| CN | 103827376 B | 6/2017 |
| CN | 105683434 B | 7/2017 |
| CN | 104285003 B | 9/2017 |
| CN | 105705695 B | 1/2018 |
| CN | 207140883 U | 3/2018 |
| CN | 208484779 U | 2/2019 |
| CN | 109680413 A | 4/2019 |
| CN | 110316033 A | 10/2019 |
| CN | 107614238 B | 2/2020 |
| CN | 107208339 B | 6/2020 |
| CN | 107532357 B | 8/2020 |
| CN | 111989430 A | 11/2020 |
| CN | 112020578 A | 12/2020 |
| CN | 107708493 B | 1/2021 |
| CN | 107208340 B | 2/2021 |
| CN | 109552123 B | 7/2021 |
| CN | 113166995 A | 7/2021 |
| CN | 213618701 U | 7/2021 |
| CN | 215203369 U | 12/2021 |
| CN | 113930900 A | 1/2022 |
| CN | 109680412 B | 2/2022 |
| CN | 115139881 A | 10/2022 |
| CN | 113930900 B | 1/2023 |
| DE | 2626748 C3 | 10/1979 |
| DE | 3127303 A1 | 1/1983 |
| DE | 3037834 C2 | 5/1987 |
| DE | 3690196 C1 | 10/1989 |
| DE | 20100848 U1 | 3/2001 |
| DE | 102004053133 A1 | 5/2006 |
| DE | 202006017670 U1 | 7/2007 |
| DE | 102006020306 A1 | 11/2007 |
| DE | 102008033468 A | 2/2009 |
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102022107559 A | 10/2022 |
| DK | 1832675 T3 | 6/2013 |
| DK | 2772576 T3 | 5/2015 |
| DK | 3255192 T3 | 3/2020 |
| DK | 202370025 A1 | 2/2024 |
| DK | 202370426 A1 | 8/2024 |
| EP | 0145603 B1 | 4/1988 |
| EP | 0370991 A2 | 5/1990 |
| EP | 0392568 A1 | 10/1990 |
| EP | 0240388 A2 | 1/1991 |
| EP | 0805064 A2 | 11/1997 |
| EP | 0890430 A2 | 1/1999 |
| EP | 0926302 A2 | 6/1999 |
| EP | 0894885 B1 | 11/2002 |
| EP | 1586687 A1 | 10/2005 |
| EP | 1270787 B1 | 6/2010 |
| EP | 1858944 B1 | 7/2011 |
| EP | 2532502 A1 | 12/2012 |
| EP | 2565304 A1 | 3/2013 |
| EP | 1832675 B1 | 4/2013 |
| EP | 1683446 B1 | 7/2013 |
| EP | 2774807 A2 | 9/2014 |
| EP | 2489770 B1 | 1/2015 |
| EP | 2772576 B1 | 4/2015 |
| EP | 2230132 B1 | 5/2016 |
| EP | 2653598 B1 | 7/2016 |
| EP | 3210487 A1 | 8/2017 |
| EP | 2792776 B1 | 10/2017 |
| EP | 2792775 B1 | 11/2017 |
| EP | 2848721 B1 | 1/2018 |
| EP | 3305500 A1 | 4/2018 |
| EP | 2751312 B1 | 7/2018 |
| EP | 3064627 B1 | 8/2018 |
| EP | 3064628 B1 | 8/2018 |
| EP | 2894246 B1 | 10/2018 |
| EP | 2966206 B1 | 11/2018 |
| EP | 3256632 B1 | 3/2019 |
| EP | 3255192 B1 | 1/2020 |
| EP | 3779017 A1 | 2/2021 |
| EP | 3826820 A1 | 6/2021 |
| EP | 3889332 A1 | 10/2021 |
| EP | 3610760 B1 | 11/2021 |
| EP | 3974572 A1 | 3/2022 |
| ES | 2335962 A1 | 4/2010 |
| ES | 2335962 B1 | 4/2010 |
| ES | 2346180 T3 | 10/2010 |
| FR | 2432108 A1 | 2/1980 |
| FR | 2596626 A1 | 10/1987 |
| FR | 2675440 B1 | 12/1993 |
| FR | 2850260 A1 | 7/2004 |
| FR | 3050409 B1 | 10/2017 |
| FR | 3063461 B1 | 3/2019 |
| FR | 3109753 B1 | 11/2021 |
| GB | 721866 A | 1/1955 |
| GB | 1009799 A | 11/1965 |
| GB | 2275695 A | 9/1994 |
| GB | 2576141 A | 2/2020 |
| GB | 2577591 B | 4/2021 |
| GB | 2589497 B | 11/2021 |
| GB | 2628886 A | 10/2024 |
| IN | 201717042989 A | 3/2018 |
| IN | 336480 B | 5/2020 |
| IN | 202047045846 A | 10/2020 |
| IN | 351780 B | 11/2020 |
| IN | 382056 B | 11/2021 |
| IN | 202117027707 A | 11/2021 |
| JP | S556515 A | 1/1980 |
| JP | S5517527 A | 2/1980 |
| JP | H04286627 A | 10/1992 |
| JP | H07300760 A | 11/1995 |
| JP | H0861414 A | 3/1996 |
| JP | H1046185 A | 2/1998 |
| JP | H115282 A | 1/1999 |

(56) References Cited

FOREIGN PATENT DOCUMENTS

| | | |
|---|---|---|
| JP | H11350326 A | 12/1999 |
| JP | 2000004993 A | 1/2000 |
| JP | 2001046185 A | 2/2001 |
| JP | 2001055719 A | 2/2001 |
| JP | 2001061612 A | 3/2001 |
| JP | 2001070106 A | 3/2001 |
| JP | 2001329631 A | 11/2001 |
| JP | 2002084894 A | 3/2002 |
| JP | 2002087879 A | 3/2002 |
| JP | 2002088636 A | 3/2002 |
| JP | 2003250667 A | 9/2003 |
| JP | 2003251089 A | 9/2003 |
| JP | 2003268668 A | 9/2003 |
| JP | 2004202858 A | 7/2004 |
| JP | 3686690 B2 | 8/2005 |
| JP | 3686692 B2 | 8/2005 |
| JP | 2006200120 A | 12/2005 |
| JP | 2006006924 A | 1/2006 |
| JP | 2006200117 A | 8/2006 |
| JP | 2006200119 A | 8/2006 |
| JP | 2007098013 A | 4/2007 |
| JP | 2009090089 A | 1/2008 |
| JP | 4181878 B2 | 11/2008 |
| JP | 4350285 B2 | 10/2009 |
| JP | 4350286 B2 | 10/2009 |
| JP | 4350287 B2 | 10/2009 |
| JP | 2011045424 A | 3/2011 |
| JP | 2011152779 A | 8/2011 |
| JP | 2011177413 A | 9/2011 |
| JP | 2013091862 A | 10/2011 |
| JP | 4835150 B2 | 12/2011 |
| JP | 4907991 B2 | 4/2012 |
| JP | 2012115515 A | 6/2012 |
| JP | 5165809 B1 | 3/2013 |
| JP | 5339107 B1 | 11/2013 |
| JP | 5418741 B1 | 2/2014 |
| JP | 2014038151 A | 2/2014 |
| JP | 5454733 B1 | 3/2014 |
| JP | 5454734 B1 | 3/2014 |
| JP | 2014064767 A | 4/2014 |
| JP | 5532178 B1 | 6/2014 |
| JP | 5532179 B1 | 6/2014 |
| JP | 2014104050 A | 6/2014 |
| JP | 5569641 B1 | 8/2014 |
| JP | 2015205611 A | 11/2015 |
| JP | 5868964 B2 | 2/2016 |
| JP | 2016028900 A | 3/2016 |
| JP | 2016036972 A | 3/2016 |
| JP | 5909581 B1 | 4/2016 |
| JP | 5976511 B2 | 8/2016 |
| JP | 5986584 B2 | 9/2016 |
| JP | 5990194 B2 | 9/2016 |
| JP | 2016189879 A | 11/2016 |
| JP | 6182249 B2 | 8/2017 |
| JP | 2017150100 A | 8/2017 |
| JP | 6228278 B2 | 11/2017 |
| JP | 6294140 B2 | 3/2018 |
| JP | WO2016189879 A1 | 3/2018 |
| JP | 6311918 B2 | 4/2018 |
| JP | 6311919 B2 | 4/2018 |
| JP | 6318643 B2 | 5/2018 |
| JP | 6347492 B2 | 6/2018 |
| JP | 2020127523 A | 2/2019 |
| JP | 6527602 B2 | 6/2019 |
| JP | 6566900 B2 | 8/2019 |
| JP | 2019173217 A | 10/2019 |
| JP | 2019173218 A | 10/2019 |
| JP | 2019189972 A | 10/2019 |
| JP | 2019210565 A | 12/2019 |
| JP | 6661666 B2 | 3/2020 |
| JP | 2020045589 A | 3/2020 |
| JP | 2020090648 A | 6/2020 |
| JP | 6725823 B2 | 7/2020 |
| JP | 2020156629 A | 10/2020 |
| JP | 6786500 B2 | 11/2020 |
| JP | 6819297 B2 | 1/2021 |
| JP | 2021045365 A | 3/2021 |
| JP | 6863537 B2 | 4/2021 |
| JP | 6909823 B2 | 7/2021 |
| JP | WO2020090648 A1 | 10/2021 |
| JP | 7002010 B2 | 2/2022 |
| JP | 7158968 B2 | 10/2022 |
| KR | 200207612 Y1 | 1/2001 |
| KR | 101141773 B1 | 5/2012 |
| KR | 101250622 B1 | 4/2013 |
| KR | 20130067823 A | 6/2013 |
| KR | 20170017488 A | 2/2017 |
| KR | 101717488 B1 | 3/2017 |
| KR | 101722929 B1 | 4/2017 |
| KR | 101722932 B1 | 4/2017 |
| KR | 20170107554 A | 9/2017 |
| KR | 20170117085 A | 10/2017 |
| KR | 101829235 B1 | 2/2018 |
| KR | 101928730 B1 | 3/2019 |
| KR | 101961514 B1 | 3/2019 |
| KR | 101983204 B1 | 5/2019 |
| KR | 102002393 B1 | 7/2019 |
| KR | 102083055 B1 | 2/2020 |
| KR | 102137446 B1 | 7/2020 |
| KR | 102148214 B1 | 8/2020 |
| KR | 102227060 B1 | 3/2021 |
| KR | 20210076130 A | 6/2021 |
| NL | 1032699 C2 | 4/2008 |
| WO | 1992018224 A1 | 10/1992 |
| WO | 9515768 A1 | 6/1995 |
| WO | 1995015768 A1 | 6/1995 |
| WO | 9702377 A1 | 1/1997 |
| WO | 1997002377 A1 | 1/1997 |
| WO | 2000047801 A1 | 8/2000 |
| WO | 2000071382 A1 | 11/2000 |
| WO | 01068967 A1 | 9/2001 |
| WO | 2002061217 A1 | 8/2002 |
| WO | 2004014690 A1 | 2/2004 |
| WO | 2004063450 A1 | 7/2004 |
| WO | 2005030011 A1 | 4/2005 |
| WO | 2006068120 A1 | 6/2006 |
| WO | 2009092153 A1 | 7/2009 |
| WO | 2010068854 A1 | 6/2010 |
| WO | 2010090093 A1 | 8/2010 |
| WO | 2011102951 A1 | 8/2011 |
| WO | 2012035736 A1 | 3/2012 |
| WO | 2012157289 A1 | 11/2012 |
| WO | 2013030400 A1 | 3/2013 |
| WO | 2013088736 A1 | 6/2013 |
| WO | 2013088737 A1 | 6/2013 |
| WO | 2013168699 A1 | 11/2013 |
| WO | 2014038151 A1 | 3/2014 |
| WO | 2014080614 A1 | 5/2014 |
| WO | 2014132484 A1 | 9/2014 |
| WO | 2015050134 A1 | 4/2015 |
| WO | 2015064523 A1 | 5/2015 |
| WO | 2015064557 A1 | 5/2015 |
| WO | 2015163188 A1 | 10/2015 |
| WO | 2016125766 A1 | 8/2016 |
| WO | 2016130602 A1 | 8/2016 |
| WO | 2016177425 A1 | 11/2016 |
| WO | 2016189879 A1 | 12/2016 |
| WO | 2017119157 A1 | 7/2017 |
| WO | 2017122370 A1 | 7/2017 |
| WO | 2017199474 A1 | 11/2017 |
| WO | 2018068451 A1 | 4/2018 |
| WO | 2019036559 A1 | 2/2019 |
| WO | 2019188090 A1 | 10/2019 |
| WO | 2019230304 A1 | 12/2019 |
| WO | 2020021263 A1 | 1/2020 |
| WO | 2020045589 A1 | 3/2020 |
| WO | 2020090648 A1 | 5/2020 |
| WO | 2020111110 A1 | 6/2020 |
| WO | 2020116327 A1 | 6/2020 |
| WO | 2020245670 A1 | 12/2020 |
| WO | 2021074601 A1 | 4/2021 |
| WO | 2021122937 A1 | 6/2021 |
| WO | 2021141601 A1 | 7/2021 |
| WO | 2022097435 A1 | 5/2022 |

(56) References Cited

FOREIGN PATENT DOCUMENTS

| | | |
|---|---|---|
| WO | 2023101995 A2 | 6/2023 |
| WO | 2023122018 A2 | 6/2023 |
| WO | 2023172483 A1 | 9/2023 |
| WO | 2023220261 A1 | 11/2023 |
| WO | 2023244721 A1 | 12/2023 |
| WO | 2023250026 A1 | 12/2023 |
| WO | 2024006134 A1 | 1/2024 |
| WO | 2024006143 A1 | 1/2024 |
| WO | 2024097012 A1 | 5/2024 |
| WO | 2024136943 A1 | 6/2024 |

OTHER PUBLICATIONS

Airstring.com, About Airstring, Jan. 18, 2021, 13 pages.
Great Britain Search and Examination Report for Application No. GB2401651.1, dated Aug. 2, 2024, 5 pages.
http://airstring.com, Introducing Airstring The Future of Cushioning, 2016, 13 pages.
https://www.toyobo-global.com/seihin/breathair/breathair_youto.htm, Applications, Sep. 10, 2019, 5 pages.
https://www.youtube.com/watch?v=eFiPBu_fBe4, The Making of a Newton Wovenaire Crib Mattress—YouTube, 3 Pages, Apr. 21, 2016.
https://www.toyobo-global.com/seihin/breathair_youto.htm, Toyobo Breathair, Cushion Materials, 1996-2013, 3 pages.
www.newtonbaby.com pages design, Borninwater, designed to breathe, Jan. 28, 2021, 11 pages.

\* cited by examiner

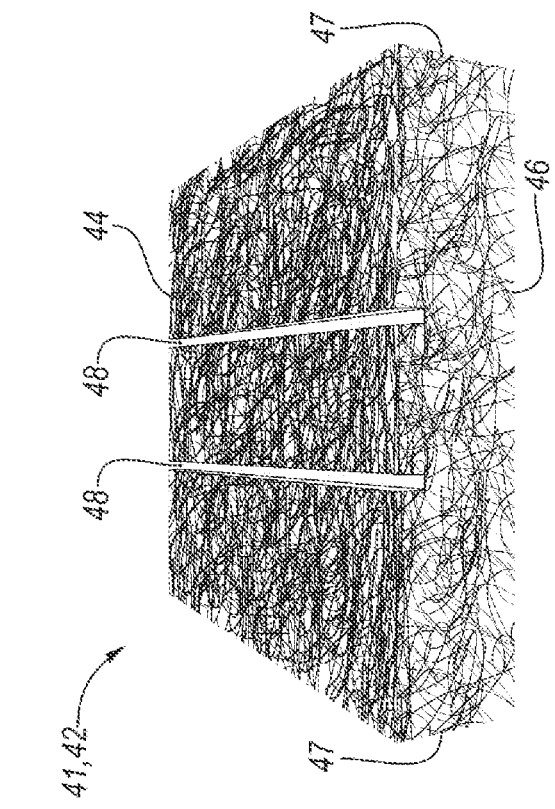
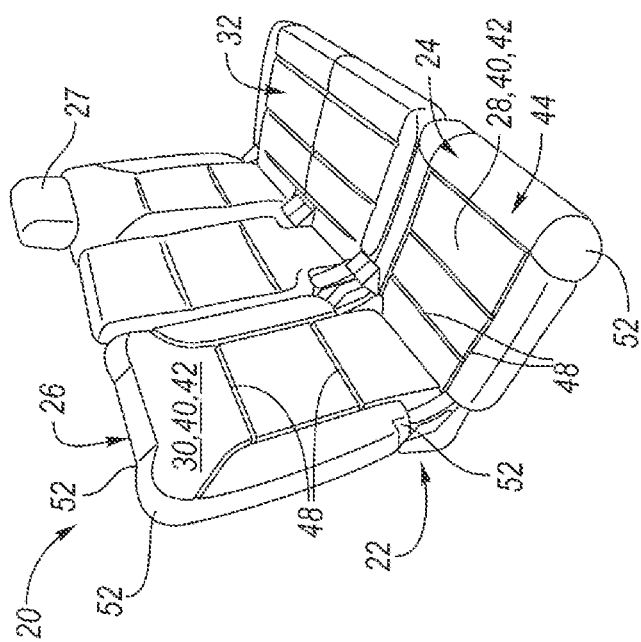
FIG. 2
FIG. 1

SEAT ASSEMBLY, CUSHION, AND TOOL AND METHOD OF FORMING

TECHNICAL FIELD

Various embodiments relate to a tool and a method of forming a nonfoam cushion and associated seat assembly, and a nonfoam cushion and a seat assembly.

BRIEF DESCRIPTION OF THE DRAWINGS

FIG. 1 illustrates a perspective view of a seat assembly according to an embodiment;

FIG. 2 illustrates a partial view a cushion member according to an embodiment and for use with the seat assembly of FIG. 1;

DETAILED DESCRIPTION

Figure 6:
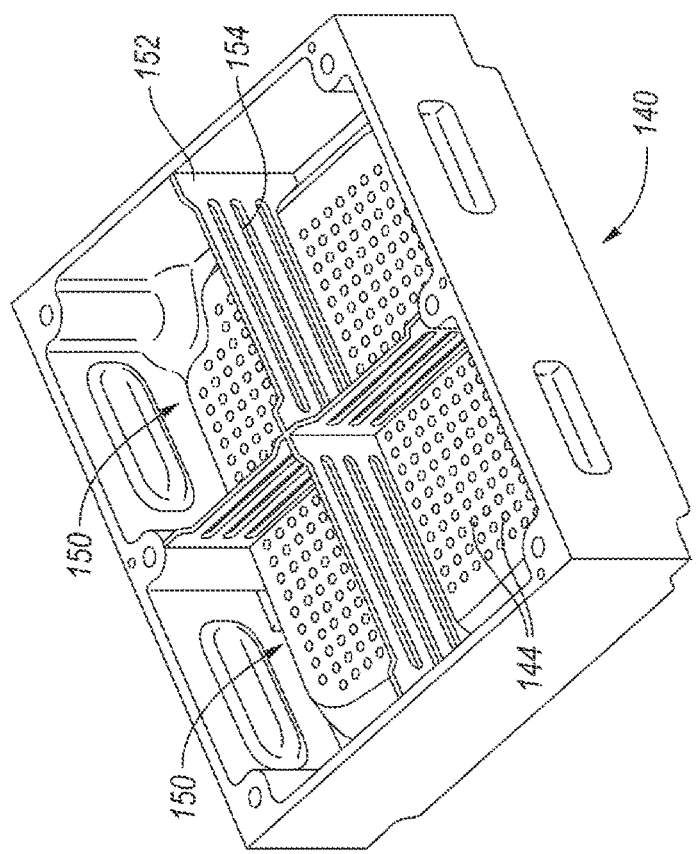
FIG. 6 illustrates another perspective view of the first or second tool of FIGS. 4-5.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The terminology controller may be provided as one or more controllers or control modules for the various components and systems. The controller and control system may include any number of controllers, and may be integrated into a single controller, or have various modules. Some or all of the controllers may be connected by a controller area network (CAN) or other system. It is recognized that any controller, circuit, or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

Referring to FIG. 1, a seat assembly 20, such as a vehicle seat assembly 20 is illustrated. In other examples, the seat assembly 20 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 20 may be configured for use with other non-vehicle applications.

The seat assembly 20 has a frame 22 or other support structure. The seat assembly has seat components, and these seat components include at least a seat bottom 24 and a seat back 26. The seat bottom 24 may be sized to receive a seated occupant to support a pelvis and thighs of the occupant. The seat back 26 may be sized to extend upright from the seat bottom 24 to support a back of the occupant. The seat assembly may additionally have a head restraint 27, with the head restraint 27 illustrated for an adjacent seat assembly only. The seat bottom 24 has a seat bottom cushion 28. The seat back 26 has a seat back cushion 30. The frame 22 may include wire suspension mats or other structure to support the cushions 28, 30.

The frame 22 provides rigid structural support for the seat components, e.g. the seat bottom 24 and seat back 26, and may be provided as multiple frame members that are moveable relative to one another to provide adjustments for the seat assembly. The frame may be formed from a stamped steel alloy, a fiber reinforced polymer, or any suitable structural material. The frame 22 may further include a substrate, e.g. a panel, to support the associated cushion.

One or more trim covers 32 are used to cover the seat bottom cushion 28 and the seat back cushion 30, and provide a seating surface for the seat assembly 20. The vehicle seat assembly 20 is shown without a trim cover, and the adjacent seat assembly illustrates the trim cover 32. In one example, the trim cover 32 covers both of the cushions 28, 30. In other examples, multiple trim covers are provided to cover the seat bottom cushion and the seat back cushion. The trim cover 32 may be formed from one or more panels of a fabric, leather, leatherette, vinyl, or other material.

A seating cushion 40 is described in further detail below, and the description may similarly be applied to the seat bottom cushion 28 or the seat back cushion 30. The seating cushion 40 as described herein may additionally be used for other seating components, or for other vehicle interior components.

In the example shown, the seating cushion 40 includes at least one nonfoam component or member 42. In one example, and as shown, the seating cushion 40 is formed solely from the nonfoam component 42, such that the nonfoam component 42 provides all of the cushioning for the seat component between the frame 22 and the trim cover 32. In other examples, the seating cushion 40 may be formed from a nonfoam component 42 as well as one or more foam components, such as a component formed from molded polyurethane foam, or other nonfoam components. The seating cushion 40 may have the nonfoam and foam components positioned to provide different regions of the cushion 40 for the seating component, e.g. a central region, and side bolster regions. By removing some or all of the traditional foam from the seating cushion 40, the seat assembly 20 may be provided with improved support and comfort, and reduced weight.

In one non-limiting example, the nonfoam component or member 42 of the seating cushion 40 is formed by a stranded mesh material, also known as an entangled three-dimensional filament structure. The stranded-mesh material is made from a polymeric mesh having a plurality of integrated polymeric strands. The stranded-mesh material may be made from, for example, a linear low density polyethylene (LLPDE) material, although other polymers and materials effective to provide the desired properties and functionality are contemplated. The stranded-mesh material may be formed using extruded filaments of linear low-density polyethylene (LLDPE) that are randomly entangled, bent, looped, or otherwise positioned and oriented, and directly bonded to each other to provide a porous mesh structure, an example of which is shown in a closer view in FIG. 2.

Referring to FIG. 2, the cushion may be formed from a cushion blank 41, or stranded mesh material blank 41, of a stranded-mesh material member 42 that includes a first surface 44 and a second surface 46 positioned opposite to the first surface 44. Side surfaces 47, or edges, extend between the first and second surfaces 44, 46. The first surface 44 may be positioned on the seat assembly 20 to support an occupant of the seat assembly. The various surfaces 44, 46, 47 may be formed from a cushion blank via a system as described below, and may include various features such as recesses, trenches, channels, concave or convex surfaces, or other contours on the surfaces 44, 46, 47, or at the intersection of associated surfaces 44, 46, 47. The cushion blank 41 may include one or more slits 48, or cuts into the cushion blank 41 that are used with the system as described below to form various features or shapes in the cushion 40 from the blank 41.

The cushion blank 41 may be formed from a consolidated filament structure that provides the stranded mesh material from which the cushion 40 and member 42 as described above is formed. Material stock such as solid granules or pellets of a plastic, such as a linear low-density polyethylene (LLDPE) may be fed from a hopper to an extruder. The extruder melts the material stock and transports it through a die plate. The material exits the extruder under pressure and in a molten state. The die plate extrudes the material into filaments via multiple small circular through holes or apertures through which the molten material passes such that a single filament is extruded from each die plate hole. The filaments fall from the die plate to a funnel to help consolidate or group the filaments into a more compact arrangement in which the filaments bend or loop and each filament contacts and bonds to at least one other filament. The consolidated filament structure then enters a fluid bath, such as a liquid tank to help temporarily support the consolidated filament structure, maintain the porosity and density, and cools the filaments from the outside to solidify them. The tank may be provided with various rollers and conveyors, and the consolidated filament structure may be cut to a desired sized and shape to form a cushion blank, e.g. using a cutting wheel, a water jet, or another technique. In one non-limiting example, the cushion blank 41 is provided as a generally rectangular prism.

The cushion blank 41 may be further cut prior to use with the system as described below in order to form one or more slots or slits 48. The cushion blank 41 may be cut to a blind depth, or partially through the blank 41, to form a slot 48. The cushion blank 41 may be further cut to a near-net shape based on the desired shape and size of the cushion 40, as well as the desired localized density properties of the cushion 40.

Figure 3:
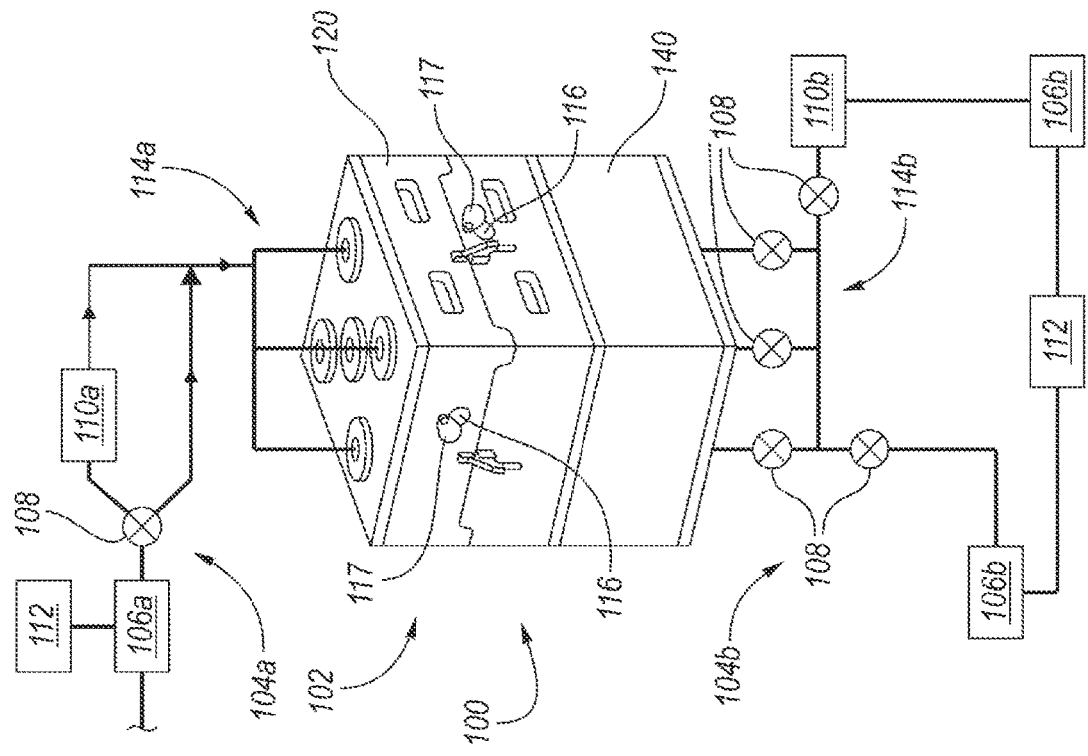
FIG. 3 illustrates a schematic view of a system according to an embodiment.
Figure 5:
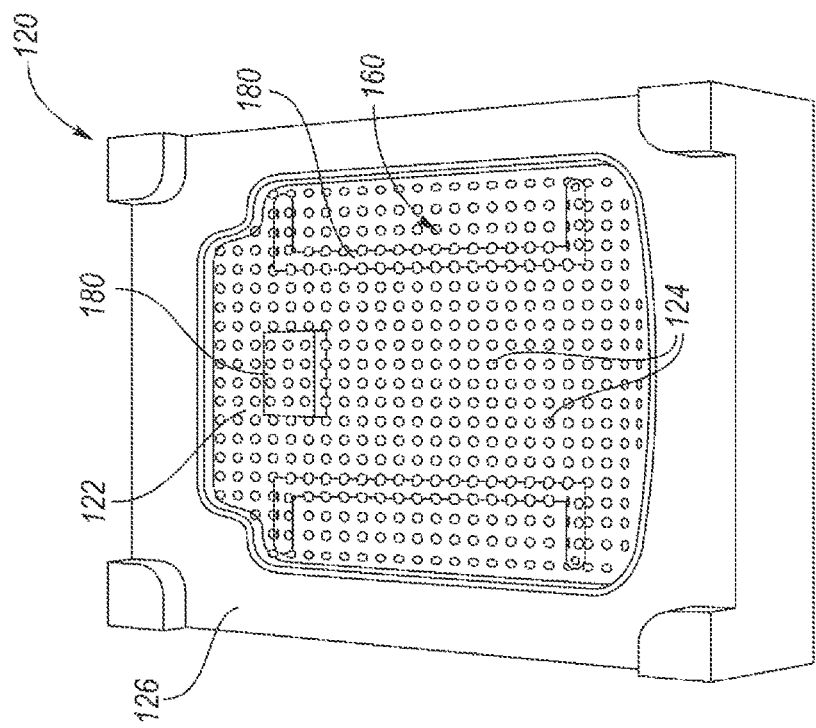
FIG. 5 illustrate a perspective view of a second tool for use with the system of FIG. 3.
Figure 4:
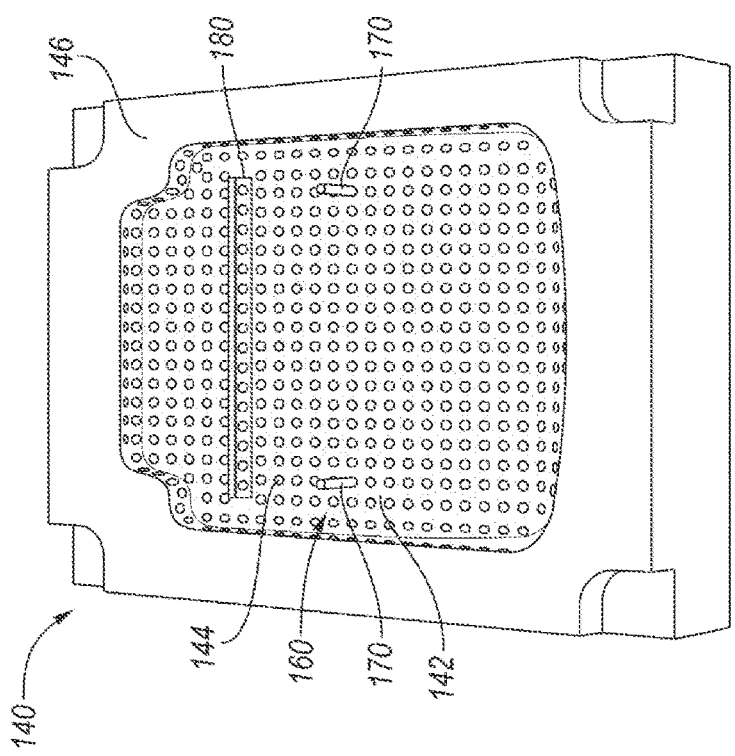
FIG. 4 illustrates a perspective view of a first tool for use with the system of FIG. 3.

FIG. 3 illustrates a system 100 for shaping the cushion 40 from a cushion blank 41. A cushion blank 41 is positioned within the system 100 to shape the cushion blank 41 into the desired final shape and with the features, e.g. recesses, contours, etc., for the cushion 40. The cushion blank 41 is formed from a consolidated filament structure as described above after the material has been cooled and cut into blank form.

The system 100 has a tool assembly 102. The tool assembly 102 is in fluid communication with one or more fluid systems 104. Each fluid system 104 has a fluid transfer device 106 such as a pump or fan, one or more valves 108, and a heater 110. The fluid system 104 may provide a flow of pressurized gas, such as air, or a liquid to the tool assembly 102, with the flow controller via a controller 112. In the non-limiting example shown, the fluid system(s) 104 provide air to the tool assembly 102.

Referring to FIGS. 3-6, the tool assembly 102 of the system 100 has a first tool 120 and a second tool 140. The first tool 120 has a first forming surface 122 defining a series of first apertures 124 therethrough. The second tool 140 has a second forming surface 142. In one non-limiting example, the second forming surface 142 defines a series of second apertures 144 therethrough. The first and second forming surfaces 122, 142 cooperate to define a cavity 160 and shaped to form a cushion member from the blank 41. The cavity 160 is shaped to form various shapes into the cushion 40 from the blank 41, including concave, convex, or other complex shapes; channels, recesses, curves, chamfers, stepped corners or regions, or the like. The cavity 160 may further be sized to be smaller in volume than the blank 41, such that the tool assembly 102 compresses the blank 41 in the tool assembly, which may provide different localized densities in different regions in the cushion 40. In other words, the blank 41 may be oversized relative to the cavity 160. The variation in localized densities in the resulting cushion 40 may be advantageous, e.g. by providing an increased density in a thinner section or region.

Collectively, the first and second tools 120, 140 each define a portion of the apertures 124, 144 in the tool assembly forming surfaces 122, 142. The apertures 124, 144 in each of the first and second tools are illustrated as being circular; however, the apertures may be provided with other cross-sectional shapes. The apertures 124, 144 may be provided with a common diameter, or may be provided with varying diameters, e.g. to better control the flow to various regions of the cushion blank 41 in the tool assembly 102. The apertures 124, 144 may additionally be generally equally spaced from one another on the forming surfaces, or the spacing between the apertures may vary, likewise providing control over the flow to various regions of the cushion blank 41 in the tool assembly 102. In various examples, there may be certain regions of the forming surfaces 122, 142 that are provided without apertures.

The first tool 120 has a mating surface 126 that cooperates with a corresponding mating surface 146 of the second tool 140 when the tool assembly 102 is closed. The first tool 120 may be translated or otherwise moved towards and away from the second tool 140 to open and close the tool assembly.

In the example shown, the tool assembly 102 has a first fluid system 104a and a second fluid system 104b. Although the first and second fluid systems 104a, 104b are illustrated and described differently with respect to one another, in other examples, two fluid systems 104a, two fluid systems 104b, or a single fluid system 104a, 104b may be used.

The first fluid system 104a has a fluid transfer device 106a selectively connected to a heater 110a via a valve 108. The controller 112 controls the position of the valve 108 and the operation of the heater 110a to provide fluid to the first inlet manifold 114a and the first tool 120 as described below. The first inlet manifold 114a may further have valves 108 to selectively control flow through each of the manifold 114a lines, e.g. by controlling the flow rate. The inlet manifold 114a is fluidly connected to the first tool 120 and to the cavity 160 via the series of first apertures 124. The fluid system 104a is fluidly connected to the tool assembly 102 via the inlet manifold 114a. The inlet manifold 114a may provide more than one inlet port into the first tool 120 as shown, or may provide a single inlet.

The second fluid system 104b has two fluid transfer devices 106b. One fluid device 106b is connected to a heater 110b, with the heater 110b connected to the inlet manifold 114b via a valve 108. The other fluid transfer device 106b is connected to the inlet manifold 114b by another valve 108. The controller 112 controls the position of the valves 108, fluid transfer devices 106b, and the heater 110b to provide fluid to the first inlet manifold 114b and the second tool 140 as described below. The first inlet manifold 114a may further have valves 108 to selectively control flow through each of the manifold 114a lines, e.g. by controlling the flow rate. The inlet manifold 114a is fluidly connected to the first tool 120 and to the cavity 160 via the series of first apertures 124. The fluid system 104a is fluidly connected to the tool assembly 102 via the inlet manifold 114a. The inlet manifold 114a may provide more than one inlet port into the first tool 120 as shown, or may provide a single inlet.

In further examples, various features of the fluid systems 104a, 104b may be combined, for example, with a single controller 112, or by using one fluid transfer device and/or heater to provide fluid flow to both manifolds 114a, 114, or the like.

The interior of the first tool 120 and the second tool 140 may each form one or more chambers opposite to the forming surfaces 122, 142, with the associated apertures 124, 144 connecting the forming surface to the respective chamber(s). FIG. 6 illustrates a view of the second tool 140 opposite to the forming surface 142, with the tool 140 having four chambers 150 divided by internal support walls 152. The internal support walls 152 provide structural support for the forming surface 142, and also may separate flow streams to maintain or control the uniformity of the flow. In other examples, apertures 154 may be provided in the support walls 152 as shown to provide cross-flow between the chambers 150.

The first tool 120 may be configured similarly to the second tool 140, with one or more support walls 152 forming multiple chambers 150 in the first tool. The inlet manifold 114, such as manifold 114a, 114b, may provide one or more inlet ports associated with each chamber 150 in the first tool and/or second tool 140. As such, the flow to different chambers 150 in the first tool and/or second tool 140, and different regions of the cavity 160 and blank 41 may be likewise controlled.

In addition to the support walls 152, the chambers 150 in the first and second tools may support various flow diverters, baffles, and other features to control the flow direction into or from the cavity 160 and through the blank 41.

In the example shown, the tool assembly 102 is provided with one or more outlets 116 that are formed in the first tool 120, the second tool 140, or in both tools 120, 140. The outlets 116 fluidly connect and vent the cavity 160 to atmosphere either directly via the cavity 160 or via one of the chambers 150, and when air is the fluid in the systems 104, or may be connected to a return line to the fluid system(s) 104a, 104b for closed systems. The outlets 116 may be provided with a closure member 117, such as a baffle, plate, or valve. The closure member 117 may be further controlled, e.g. via the controller 112 between an open position to vent the cavity, or a closed position to retain or maintain fluid within the cavity 160. In various examples, the closure members 117 may be closed or opened while the fluid transfer devices 106 and/or heaters 110 are being operated, e.g. to provide the desired temperature profile within the cavity 160. In other examples, the tool assembly 102 is provided without closure members 117 such that the outlets(s) 116 are not closable. In a further example, the tool assembly 102 is provided without defined outlet ports 116, and the tool assembly 102 may vent via various gaps or spaces between the mating surfaces 126, 146. The fluid flows from each fluid system 104a, 104b, into their respective inlet manifolds 114a, 114b, into the cavity 160, and then to the outlet(s) 116.

In a further example, the tool assembly 102 is provided with a single fluid system 114a or 114b, and a single outlet 116 in place of the other inlet manifold 114b, 114a, such that fluid flows sequentially from one inlet manifold, through both tools 120, 140, and to an outlet 116 sequentially. The fluid may flow sequentially in the assembly 102 from the inlet manifold 114, into the chambers 150 in the first tool 120, through the first series of apertures 124, through the cavity 160 and blank 41, through the series of second apertures 144, into the chambers 150 in the second tool 140, and to the outlet 116. As described below, the fluid may be at various temperatures to control the shaping of the blank 41.

As the blank 41 is formed from a stranded mesh material and is porous, the fluid flow into the inlet manifold 114, flows through the series of first apertures 124 in the first tool, through the stranded mesh material of the blank 41, through the series of second apertures 144 in the second tool, and to the outlet 116. The fluid therefore convectively heats or cools the filaments and strands internally in the blank 41, as well as the strands along the outer surfaces of the blank 41.

The first tool 120 and/or the second tool 140 may be provided with or more locating members 170 extending outwardly from the respective forming surface 122, 142. In the example shown, the second tool 140 has a plurality of locating members 170 provided as pins. The locating features 170 may be used to position the blank and retain the blank 41 in the desired position on the tool before and while the tool assembly is closed. As the blank 41 is a filament structure, the pins 170 easily extend into the blank 41 and between the filaments when locating the blank on the tool. In further examples, the locator pins 170 may optionally be retractable such that they are retracted when the tool assembly is opened to facilitate removal of the cushion 40.

The forming surface 122 and/or the forming surface 142 may be provided with one or more protrusions 180 to form a corresponding channel, recess, pocket, or other concave region in the cushion 40 from the blank 41. Depending on the geometry of the protrusion 180, the blank 41 may be cut in a location corresponding to the protrusion prior to inserting the blank into the tool assembly. For example, when a channel is being formed, the blank 41 may be cut with a blind cut or slit 48 to provide relief and reduce gaps, warp, or distortion adjacent to the channel in the resulting cushion 40. Likewise, when a recessed region is being formed, blank 41 may be cut with a blind cut or slit 48 along the outer perimeter of the recess to provide relief and reduce gaps or warp adjacent to the recess in the resulting cushion 40 as the protruding forming surface 180 presses the blank material in the recessed region. In other examples, other types of cuts may be provided such as a planar cut, a curved cut, or another complex geometry cut as a part of a through cut or a partial cut into the blank 41. These protrusions 180 may further provide locating features or members for the tool assembly 102.

The system 100 also has a controller 112. The controller 112 is configured to control the fluid transfer device(s) 106, the valves 108, and the heater(s) 110 to selectively fluidly couple the heater 110 to the inlet manifold 114 to provide fluid to the cavity 160 at a first temperature, and selectively fluidly decouple the inlet manifold 114 from the heater 110 to provide fluid to the cavity 160 at a second temperature less than the first temperature. To the extent that the tool assembly 102 has closure members 117 for the outlets, the controller 112 may control the position of the closure members 117 to retain fluid within the cavity 160 or vent the cavity. For example, the controller 112 may close the closure members 117 when providing fluid at the first temperature, and open the closure members 117 when providing fluid at the second temperature, or vice versa. The controller 112 may further at least partially open or at least partially close the closure members 117 while providing fluid at the first temperature and/or second temperature to control the temperature profile within the cavity 160. The system 100 may have various sensors, such as temperature sensors, for use in controlling the flow through the tool assembly 102. The first and second temperatures may be set based on a softening temperature of the material for the filaments of the blank 41. In one example, the first temperature is set at an offset above the softening temperature, e.g. twenty to thirty degrees Celsius above the softening temperature. In another example, the second temperature is set at an offset below the softening temperature, and may be provided at ambient temperature. The controller 112 may further control the time that the fluid is provided into the cavity 160 at the first temperature, the time that the fluid is provided to the cavity 160 at the second temperature, the flow rate of the fluid, and/or the ramp on the temperature of the fluid in order to further control the shaping process for the blank 41. The controller 112 may additionally control valves 108 on individual lines in the inlet manifold 114 to control flow to various chambers 150 in the tools 120, 140, and to different regions of the cavity 160.

The softening temperature may refer to the glass transition temperature of the material, and be less than the melting point, thereby allowing the filaments to soften and change shape of the filament and the blank 41, without completely melting the filaments and losing the overall filament structure and porosity in the blank 41 and resulting cushion.

In various examples, a method is provided for use with the system 100 and controller 112 and to form a cushion 40 from a cushion blank 41 or a stranded mesh material blank 41. In a first step, the blank is inserted into a cavity 160 of a tool assembly 102 shaped to form a cushion member. The first tool 120 is moved relative to the second tool 140 of the tool assembly after the blank is inserted into the cavity to close the tool assembly with the blank inside. The blank 41 may be compressed by the first and second tools 120, 140 as the size of the blank 41 may be larger than the cavity 160, e.g. the volume of the blank may be greater than the volume of the cavity. In various examples, the blank 41 may be compressed to different degrees in different regions based on the size and shape of the blank 41 relative to the size and shape of the cavity 160.

To the extent that there are any slot(s) 48 cut into the blank 41, a corresponding protrusion 180 of the forming surface is inserted into the slot of the blank when inserting the blank into the cavity 160 of the tool assembly.

Note that the tools 120, 140 may be preheated prior to insertion of the blank 41 into the tool assembly, or any heating to the tools 120, 140 may occur only after the blank 41 is inserted via the fluid flow at the first temperature.

In a second step, the controller 112 operates the fluid transfer device(s) 106, the valves 108, and the heater(s) 110 to circulate fluid above a first temperature threshold into the inlet manifold 114 and through a series of apertures 124 defined in a forming surface 122 of the tool assembly and into the cavity 160 thereby softening the blank 41 and conforming a shape of the blank to the forming surfaces 122, 142. The controller 112 may further control any closure members 117, e.g. to a closed position to generally retain fluid within the cavity 160, and/or to an open position to vent the cavity 160.

In a third step, the controller 112 then controls the fluid transfer device 106, the valves 108, and the heater 110 to circulate the fluid below a second temperature threshold through the series of apertures 124 in the forming surfaces 122 and into the cavity 160 thereby setting the shape of the blank 41 to the forming surfaces 122, 142 and forming a cushion member. In various examples, the first temperature threshold is greater than a softening temperature of the blank 41, and the second temperature threshold is less than a softening temperature of the blank 41. In a further example, the fluid may be provided to the tool assembly at an ambient temperature during the third step. The controller 112 may further control any closure members 117, e.g. to an open position to generally vent fluid within the cavity 160, and/or to a closed position.

The second step may be a first temperature cycle for the blank 41 to soften and shape the blank 41 to the shape defined by the forming surfaces, and the third step may be a second temperature cycle for the blank to set the shape of the blank 41. In various examples, the first, second, and third steps may be performed sequentially.

Figure 7:
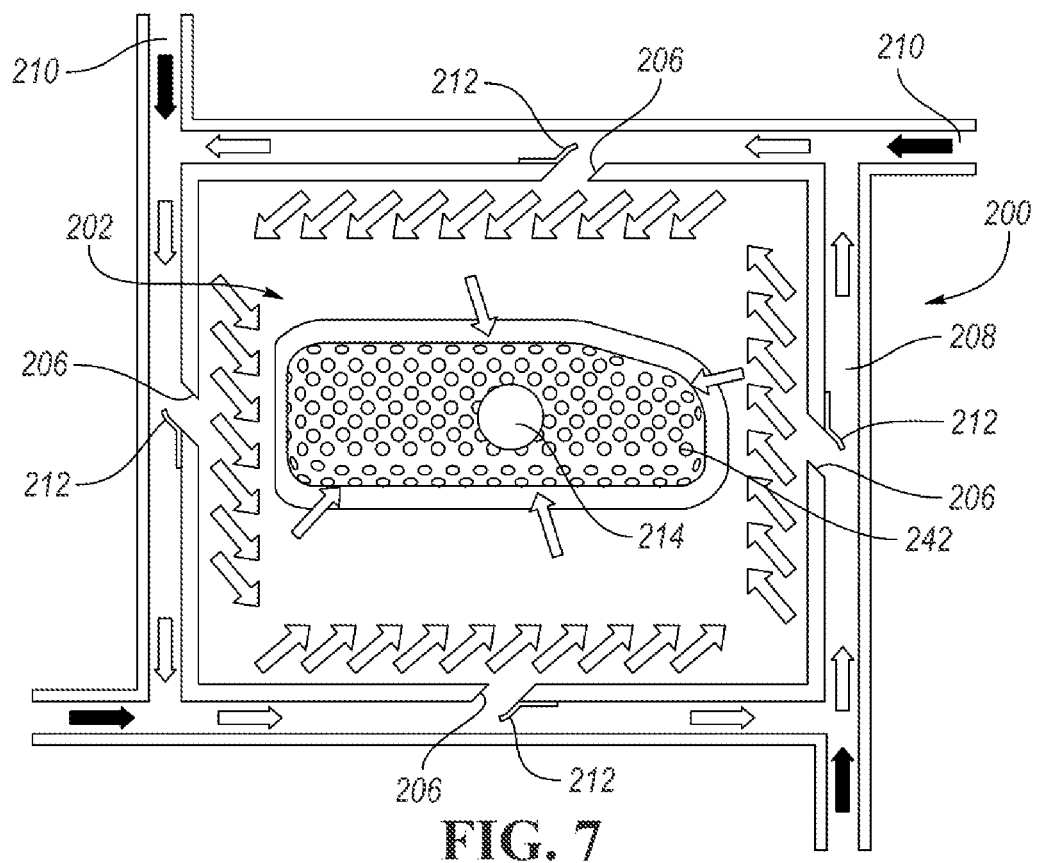
FIG. 7 illustrates a top schematic view of a system according to another embodiment in a closed position.
Figure 8:
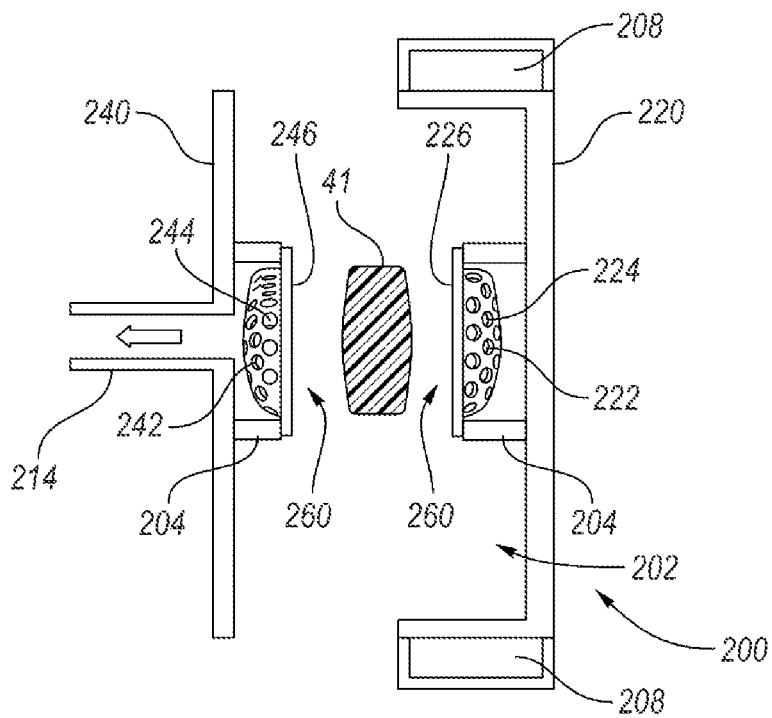
FIG. 8 illustrates a side schematic view of the system of FIG. 7 in an open position.

Referring to FIGS. 7-8, a tool assembly 200 is illustrated schematically according to another embodiment. In various examples, the tool assembly 200 may be used in place of the tool assembly 102 and with the system 100 of FIG. 3 and generally according to the method, as described above. Elements that are the same as or similar to those described above may not be described with respect to FIGS. 7-8 for simplicity. FIG. 7 illustrates a top schematic view of the tool assembly 200, and FIG. 8 illustrates a side schematic view of the tool assembly 200 in an open position.

The tool assembly 200 has a first tool 220 and a second tool 240. The first tool 220 and the second tool 240 are each positioned within a central region of a common chamber 202. Each of the first and second tools 220, 240 may be supported by standoffs or other support members 204 within the chamber 202. The first tool 220 has a first forming surface 222 defining a series of first apertures 224 therethrough. The second tool 240 has a second forming surface 242 defining a series of second apertures 244 therethrough. The first and second forming surfaces 222, 242 cooperate to define a cavity 260 shaped to form a cushion from a cushion blank 41. The first tool 220 has a mating surface 226 that mates with a corresponding mating surface 246 of the second tool when the tool assembly 200 is closed. The first tool 220 may be translated or otherwise moved towards and away from the second tool 240 to open and close the tool assembly.

The chamber 202 has at least one inlet 206 in fluid communication with the circumferential inlet manifold 208 in fluid communication with a fluid system, such as fluid system 104a or 104b. The inlet manifold 208 extends about an outer peripheral of the chamber 202, or along at least a portion of the outer perimeter of the chamber. The inlet(s) 206 from the inlet manifold 208 to the chamber 202 is provided along the outer perimeter wall of the chamber. The circumferential inlet manifold 208 may receive fluid from the inlet manifold 114 via ports 210, or may be a part of the inlet manifold. In the example shown, the chamber has a single inlet 206; however, other numbers of inlets 206 are also contemplated. The circumferential inlet manifold 208 may receive flow from a single port 210 or from multiple ports 210 as shown. The inlet 206 may have an associated deflector 212. The deflector may extend into the circumferential inlet manifold 208 at an angle in order to help direct from the manifold 208 with the desired flow angle. The inlet 206 may further be formed with walls that are angled relative to the adjacent circumferential flow manifold 208 and with respect to the direction of fluid flow therein, as shown in FIG. 7. In one non-limiting example the deflector 212 and the angle of the inlet 206 are at forty-five degrees, although other acute angles are also contemplated. Although only one inlet 206 is shown, multiple inlets 206 and deflectors are contemplated, with the inlets 206 spaced along the circumferential manifold 208 to assist in created a vortex flow or circular flow within the chamber 202.

The chamber 202 also defines an outlet 214. The outlet 214 is positioned to fluidly connect the central region of the chamber 202 to atmosphere such that fluid circulates radially inward within the chamber 202 from the inlet(s) 206 along the outer perimeter of the chamber 202 (and from the circumferential inlet manifold 208) to the outlet 214. This generally provides a vortex flow geometry within the chamber 202.

The tool assembly 200 may be positioned in the system 100 and controlled via controller 112 according to a method as described above. According to various examples, the fluid flows sequentially in the assembly 102 from the inlet manifold 114, circumferential manifold 208, through the inlets 206 and into the chamber 202, and then has a vortex or circular flow path towards the tools 220, 240. The fluid flows through the apertures 224, 244 in the tools 220, 240 and through the cavity 160 and blank 41, and to the outlet 214. As described above, the fluid may be at various temperatures to control the shaping of the blank 41.

As the blank 41 is formed from a stranded mesh material and is porous, the fluid flow into the inlet manifold 114, flows through the series of first apertures 124 in the first tool, through the stranded mesh material of the blank 41, through the series of second apertures 144 in the second tool, and to the outlet 116. The fluid therefore convectively heats or cools the filaments and strands internally in the blank 41, as well as the strands along the outer surfaces of the blank 41.

Clause 1. A method is provided and a stranded mesh material blank is inserted into a cavity of a tool assembly shaped to form a cushion member. Fluid is circulated above a first temperature threshold through a series of apertures defined in a forming surface of the tool assembly and into the cavity thereby softening the blank and conforming a shape of the blank to the forming surface. Fluid is circulated below a second temperature threshold through the series of apertures in the forming surface and into the cavity thereby setting the shape of the blank to the forming surface and forming a cushion member.

Clause 2. The method of clause 1 further comprising moving a first tool of the tool assembly relative to a second tool of the tool assembly after the stranded mesh material blank is inserted into the cavity.

Clause 3. The method of clause 2 wherein the first tool defines a first portion of the series of apertures, and wherein the second tool defines a second portion of the series of apertures.

Clause 4. The method of clause 2 further comprising compressing the stranded mesh material blank by moving the first tool relative to the second tool.

Clause 5. The method of any one of clauses 1-4 further comprising cutting a slot in the stranded mesh material blank to a blind depth prior to inserting the blank into the cavity of the tool assembly, and inserting a protrusion of the forming surface into the slot of the blank when inserting the blank into the cavity of the tool assembly.

Clause 6. The method of any one of clauses 1-5 wherein the first temperature threshold is greater than a softening temperature of the blank, and wherein the second temperature threshold is less than a softening temperature of the blank.

Clause 7. The method of any one of clauses 1-6 further comprising forming the stranded mesh material member blank as a polymeric mesh having a plurality of integrated polymeric strands.

Clause 8. The method of clause 7 further comprising forming the stranded mesh material member by extruding material through a die, funneling the extruded material from the die through a funnel, and moving the extruded material after the funnel via one or more rollers; and cutting the stranded mesh material blank after forming and prior to inserting the blank into the cavity of the tool assembly.

Clause 9. A cushion for a seat assembly, the cushion comprising a stranded mesh material member formed by the method of clause 8.

Clause 10. A system is provided with a first tool comprising a first forming surface defining a series of first apertures therethrough, and a second tool comprising a second forming surface defining a second series of apertures therethrough, with the first and second forming surfaces cooperating to define a cavity and shaped to form a cushion member. An inlet manifold is fluidly connected to the cavity via at least one of the series of first apertures or the series of second apertures.

Clause 11. The system of clause 10 wherein the first tool defines one or more first chambers in fluid communication with the inlet manifold, the one or more first chambers in fluid communication with the cavity via the series of first apertures in the first forming surface.

Claim 12. The system of clause 10 or 11 wherein the inlet manifold is a first inlet manifold supported by the first tool and fluidly connected to the cavity via the series of first apertures, and wherein the system further comprises a second inlet manifold supported by the second tool and fluidly connected to the cavity via the second series of apertures.

Clause 13. The system of any one of clauses 10-12 further comprising an outlet fluidly coupled to the inlet manifold via the series of first apertures and the cavity.

Clause 14. The system of clause 13 wherein the outlet is at least partially defined by one or more outlet ports in at least one of the first tool or the second tool, wherein each of the one or more outlet ports comprise a closure member movable between an open position and a closed position.

Clause 15. The system of clause 13 wherein the first tool and the second tool are positioned within a central region of a chamber, the chamber having at least one inlet in fluid communication with the inlet manifold, and defining the outlet.

Clause 16. The system of clause 15 wherein the inlet manifold extends along at least a portion of an outer perimeter wall of the chamber, the inlet is positioned along the outer perimeter wall of the chamber; and the outlet is positioned to fluidly connect the central region of the chamber to atmosphere such that fluid circulates radially inward within the chamber from the inlet to the outlet.

Clause 17. The system of clause 16 wherein the inlet further comprises a deflector positioned to extend into the inlet manifold and direct fluid into the chamber.

Clause 18. The system of any one of clauses 10-17 further comprising one or more locating members extending outwardly from the first forming surface and/or the second forming surface.

19. The system of any one of clauses 10-18 further comprising a fluid transfer device, a heater, a valve in fluid communication with the inlet manifold, and a controller. The controller is configured to control the valve to selectively fluidly couple the heater to the inlet manifold to provide fluid to the cavity at a first temperature, and selectively fluidly decouple the inlet manifold from the heater to provide fluid to the cavity at a second temperature less than the first temperature.

Clause 20. A system is provided with a first tool comprising a first forming surface defining a series of first apertures therethrough, and a second tool comprising a second forming surface defining a series of second apertures therethrough, with the first and second forming surfaces cooperating to define a cavity and shaped to form a cushion member. One or more inlet manifolds are provided. A fluid system is provided with a fluid transfer device, a valve, and a heater in fluid communication with the inlet manifold. A controller is configured to control the valve to selectively fluidly couple the heater to the inlet manifold to provide fluid to the cavity at a first temperature, and selectively fluidly decouple the inlet manifold from the heater to provide fluid to the cavity at a second temperature less than the first temperature.

Clause 21. Any one of the preceding clauses 1-20 in any combination.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A system, comprising:
 a first tool comprising a first forming surface defining a series of first apertures therethrough;
 a second tool comprising a second forming surface defining a series of second apertures therethrough, the first forming surface and the second forming surface cooperating to define a cavity and shaped to form a cushion member; and
 an inlet manifold fluidly connected to the cavity via at least one of the series of first apertures or the series of second apertures, wherein the inlet manifold extends along an outer perimeter wall of a chamber comprising the first tool and the second tool, and wherein the chamber comprises at least one inlet in a fluid communication with the inlet manifold, and wherein the at least one inlet comprises a deflector that is positioned to extend into the inlet manifold at a fixed angle relative to the inlet, such that the deflector is adapted to direct fluid into the chamber.

2. The system of claim 1, wherein the first tool defines one or more first chambers in fluid communication with the inlet manifold, the one or more first chambers in fluid communication with the cavity via the series of first apertures in the first forming surface.

3. The system of claim 1, wherein the inlet manifold is a first inlet manifold supported by the first tool and fluidly connected to the cavity via the series of first apertures, and
 wherein the system further comprises a second inlet manifold supported by the second tool and fluidly connected to the cavity via the second series of apertures.

4. The system of claim 1, further comprising an outlet fluidly coupled to the inlet manifold via the series of first apertures and the cavity.

5. The system of claim 4, wherein the outlet is at least partially defined by one or more outlet ports in at least one of the first tool or the second tool, and wherein each of the one or more outlet ports comprise one of a baffle, a plate or a valve that is movable between an open position and a closed position.

6. The system of claim 4, wherein the first tool and the second tool are positioned within a central region of a chamber and the chamber defining the outlet.

7. The system of claim 6, wherein, the at least one inlet is positioned along the outer perimeter wall of the chamber, and wherein the outlet is positioned to fluidly connect the central region of the chamber to atmosphere such that fluid circulates radially inward within the chamber from the at least one inlet to the outlet.

8. The system of claim 1, further comprising one or more members extending outwardly from the first forming surface and/or the second forming surface.

9. The system of claim 1, further comprising a fluid transfer device, a heater, a valve in fluid communication with the inlet manifold, and a controller configured to control the valve to selectively fluidly couple the heater to the inlet manifold to provide fluid to the cavity at a first temperature, and selectively fluidly decouple the inlet manifold from the heater to provide fluid to the cavity at a second temperature less than the first temperature.

10. A system, comprising:
a first tool comprising a first forming surface defining a series of first apertures therethrough;
a second tool comprising a second forming surface defining a series of second apertures therethrough, the first forming surface and the second forming surface cooperating to define a cavity and shaped to form a cushion member;
one or more inlet manifolds;
a fluid system comprising a fluid transfer device, a valve, and a heater in fluid communication with the one or more inlet manifolds; and
a controller configured to control the valve to selectively fluidly couple the heater to the one or more inlet manifolds to provide fluid to the cavity at a first temperature, and selectively fluidly decouple the one or more inlet manifolds from the heater to provide fluid to the cavity at a second temperature less than the first temperature, wherein the one or more inlet manifolds extends along an outer perimeter wall of a chamber comprising the first tool and the second tool, and wherein the chamber comprises at least one inlet in a fluid communication with the inlet manifold, and wherein the at least one inlet comprises a deflector that is positioned to extend into the inlet manifold at a fixed angle relative to the inlet, such that the deflector is adapted to direct fluid into the chamber.

11. The system of claim 1, wherein at least a portion of the cushion member is formed of a non-foam component.

12. The system of claim 10, wherein the first tool defines one or more first chambers in fluid communication with the one or more inlet manifolds, the one or more first chambers in fluid communication with the cavity via the series of first apertures in the first forming surface.

13. The system of claim 10, wherein one of the one or more inlet manifolds is a first inlet manifold supported by the first tool and fluidly connected to the cavity via the series of first apertures, and
wherein the system further comprises a second inlet manifold of the one or more inlet manifolds supported by the second tool and fluidly connected to the cavity via the second series of apertures.

14. The system of claim 1, further comprising an outlet fluidly coupled to the one or more inlet manifolds via the series of first apertures and the cavity.

15. The system of claim 14, wherein the outlet is at least partially defined by one or more outlet ports in at least one of the first tool or the second tool, and wherein each of the one or more outlet ports comprise one of a baffle, a plate or a valve that is movable between an open position and a closed position.

16. The system of claim 14, wherein the first tool and the second tool are positioned within a central region of a chamber and the chamber defining the outlet.

17. The system of claim 16, wherein the at least one inlet is positioned along the outer perimeter wall of the chamber, and wherein the outlet is positioned to fluidly connect the central region of the chamber to atmosphere such that fluid circulates radially inward within the chamber from the at least one inlet to the outlet.

18. The system of claim 10, further comprising one or more members extending outwardly from the first forming surface and/or the second forming surface.

19. The system of claim 10, wherein the series of first apertures are equally spaced from one another on the first forming surface and the series of second apertures are equally spaced from one another on the second forming surface.

20. The system of claim 1, wherein the deflector extends into the inlet manifold at an angle relative to the inlet manifold.

21. The system of claim 1, wherein the at least one inlet comprises walls which are angled relative to the inlet manifold.

* * * * *